Figure 1:
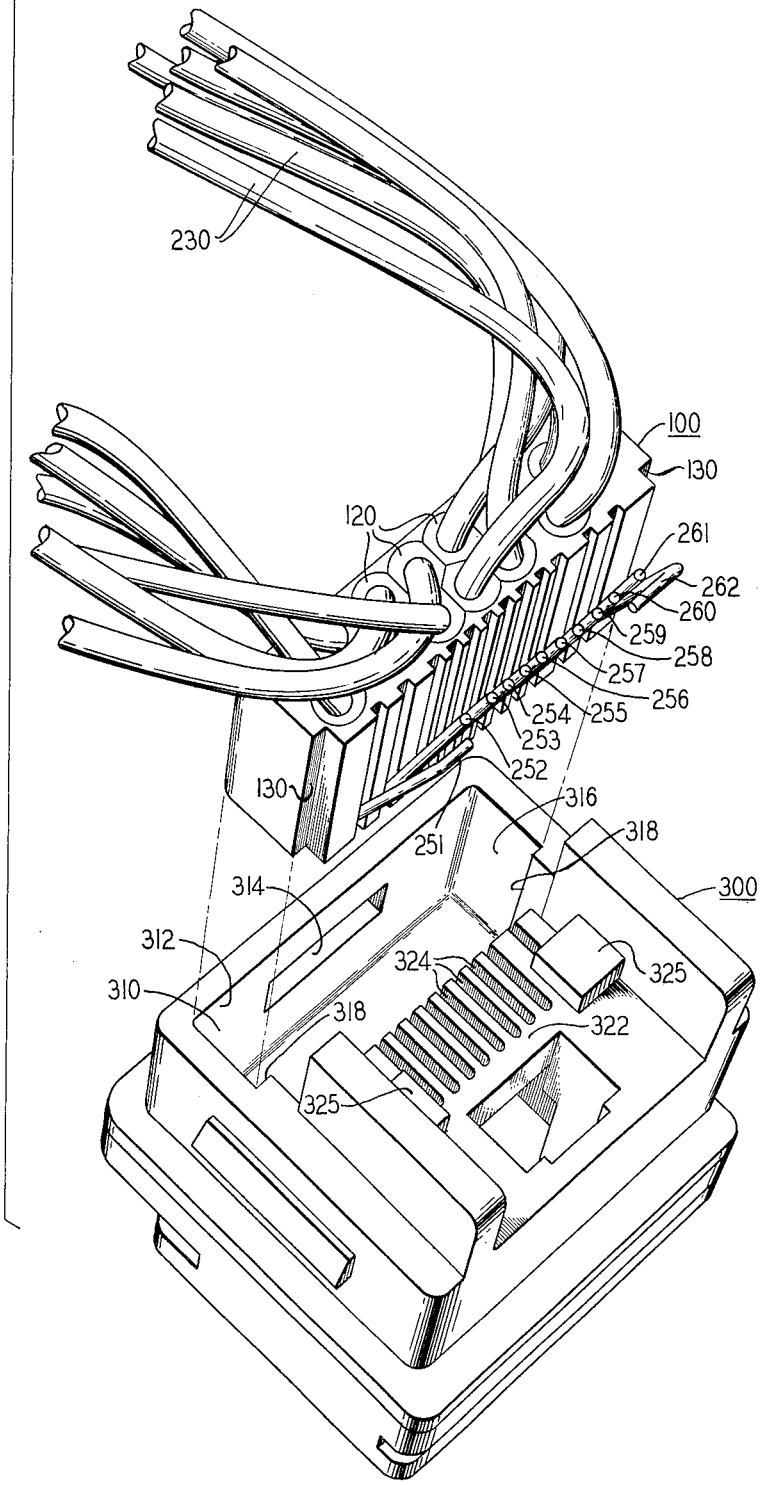
Figure 2:
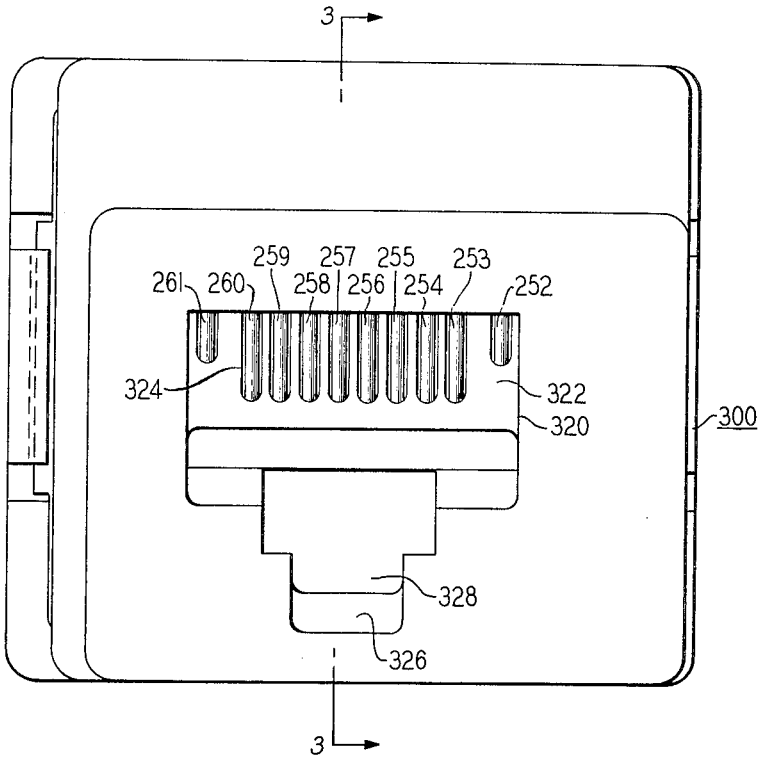
Figure 3:
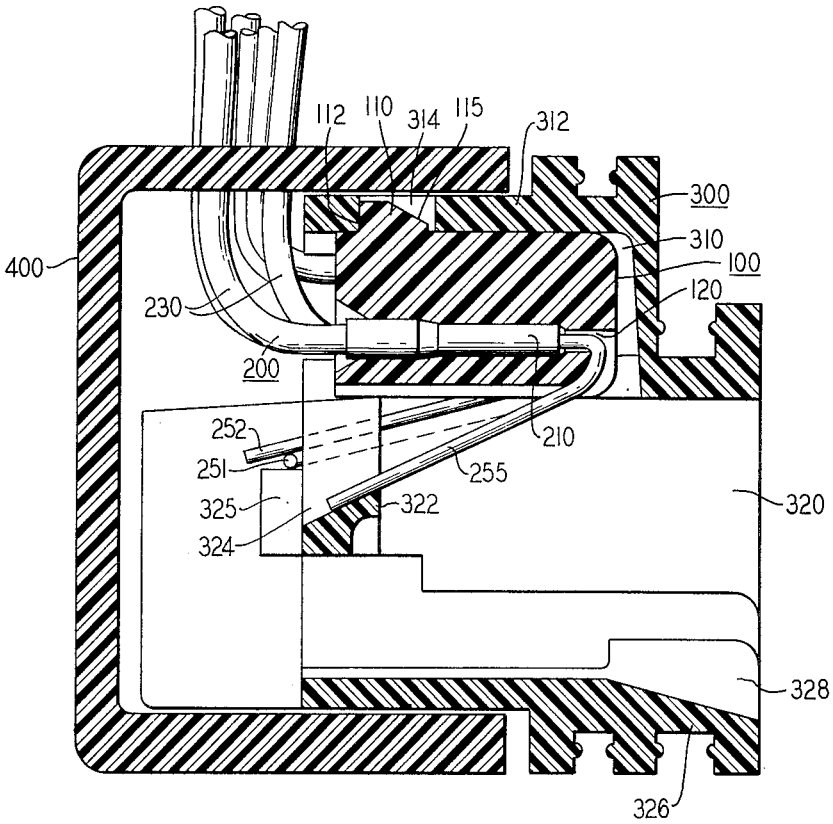
Figure 4:
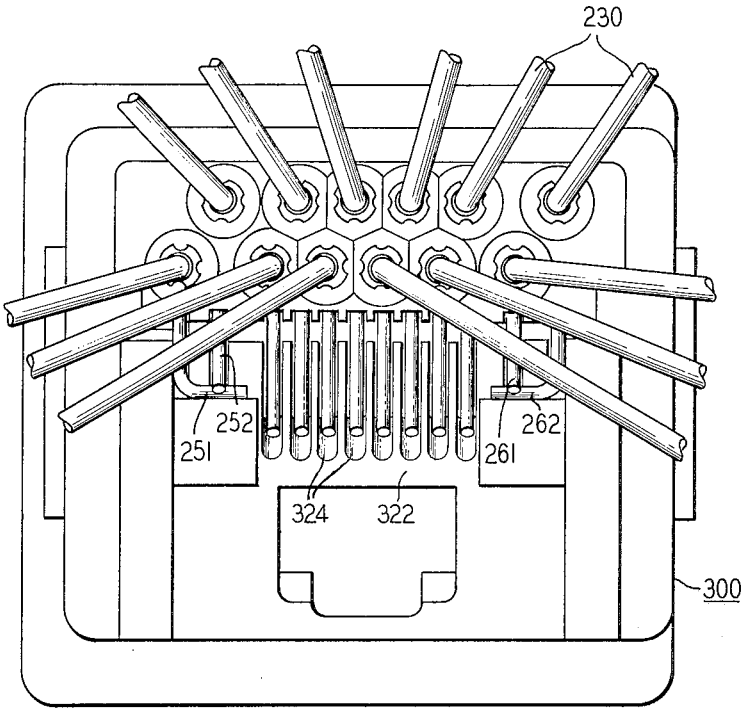
Figure 5:
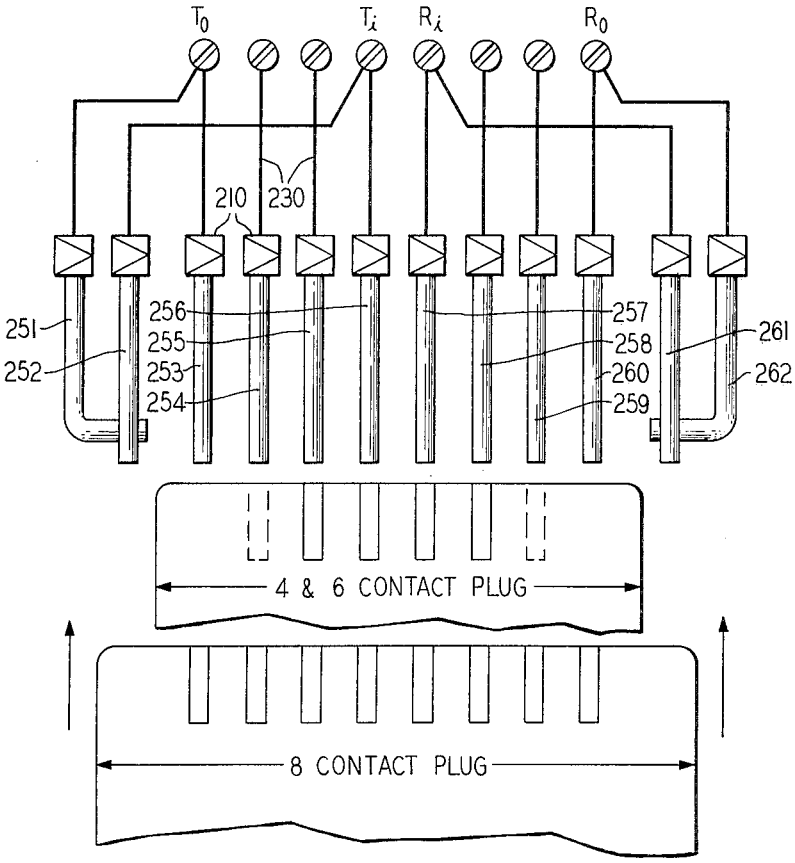

United States Defensive Publication [19] (H) [11] T961,003

Krumreich [43] Aug. 2, 1977

[54] FEMALE CONNECTOR

[75] Inventor: Charles Louis Krumreich, Indianapolis, Ind.

[73] Assignee: Bell Telephone Laboratories, Incorporated, Murray Hill, N.J.

[21] Appl. No.: 765,845

[22] Filed: Feb. 4, 1977

[51] Int. Cl.[2] ..... H04M 11/04

[52] U.S. Cl. ..... 339/176 M; 179/1 PC; 179/1 SW

[57] ABSTRACT

A female connector or jack in accordance with the present invention includes a plurality of contact springs that are arranged in a row side by side one another and extend rearwardly cantilever fashion within a plug-receiving opening. It further includes a switch disposed on each side of the connector contacts. Each switch comprises a movable contact spring that is normally in engagement with a stationary contact spring. The movable contact springs extend within the plug-receiving opening while the stationary contact springs are remote to the opening.

The jack is intended to be connected to a telephone line by respectively wiring the switches in series with the ring and tip conductors and wiring an individual connector contact in parallel with each of the switch contacts. Continuity in the telephone line is then provided by the closed switches of the jack when no plug is inserted into the jack. In addition, if a plug of a size not to engage the movable switch contacts is inserted into the jack and the contacts on the plug only engage one of the connector contacts wired to the tip conductor and one of the connector contacts wired to the ring conductor, line continuity continues and the station apparatus terminated by the plug is bridged across the telephone line.

But if a plug of a size to engage the movable switch contacts is inserted into the jack, the movable contacts are deflected from their associated stationary contacts to interrupt the continuity of the telephone line. Then by providing the plug with contacts that engage both connector contacts wired to the tip conductor and both connector contacts wired to the ring conductor, the station apparatus terminated by the plug is connected in series with the telephone line.

10 Claims, 3 Sheets Drawing,

14 Pages Specification

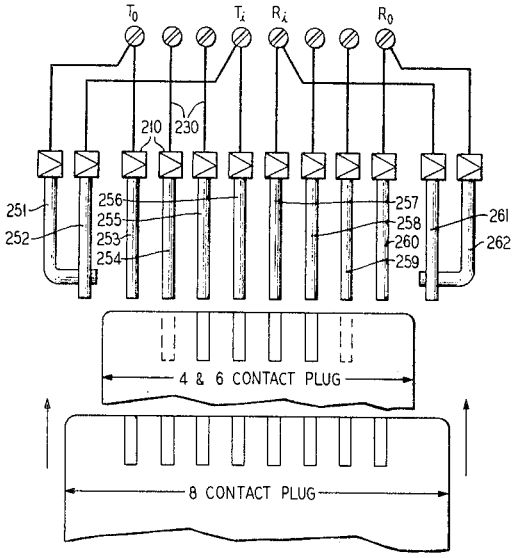

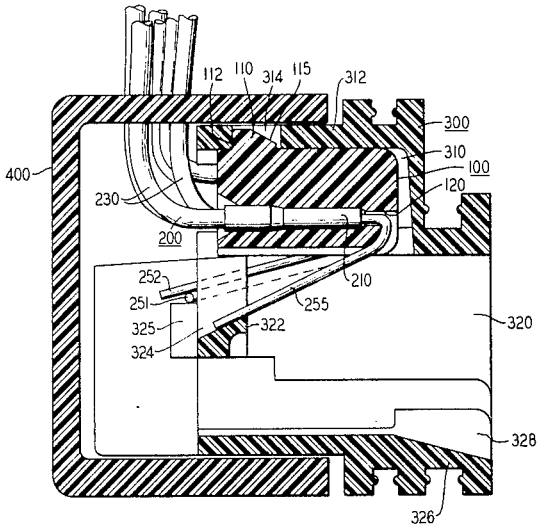

The file of this unexamined application may be inspected and copies thereof may be purchased (849 O.G. 1221, Apr. 9, 1968).